(12) United States Patent
Barber et al.

(10) Patent No.: US 11,699,193 B2
(45) Date of Patent: Jul. 11, 2023

(54) SCALABLE ENFORCEMENT OF AGGREGATION CONSTRAINTS WITHIN TRANSACTIONS

(71) Applicant: International Business Machines Corporation, Armonk, NY (US)

(72) Inventors: Ronald J. Barber, San Jose, CA (US); Vijayshankar Raman, Cupertino, CA (US); Richard Sefton Sidle, Ottawa (CA); Yuanyuan Tian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/865,518

(22) Filed: May 4, 2020

(65) Prior Publication Data

US 2021/0342950 A1 Nov. 4, 2021

(51) Int. Cl.
*G06Q 40/12* (2023.01)
*G06F 16/25* (2019.01)
*G06F 16/901* (2019.01)
*G06Q 10/087* (2023.01)
*G06F 16/23* (2019.01)
*G06Q 20/40* (2012.01)
*G06Q 30/04* (2012.01)

(52) U.S. Cl.
CPC ......... *G06Q 40/12* (2013.12); *G06F 16/2365* (2019.01); *G06F 16/2379* (2019.01); *G06F 16/25* (2019.01); *G06F 16/9024* (2019.01); *G06Q 10/087* (2013.01); *G06Q 20/405* (2013.01); *G06Q 30/04* (2013.01)

(58) Field of Classification Search
CPC .... G06Q 40/12; G06Q 10/087; G06Q 20/405; G06Q 30/04
See application file for complete search history.

(56) References Cited

U.S. PATENT DOCUMENTS

| | | | |
|---|---|---|---|
| 7,677,441 B2 * | 3/2010 | Bernstein | G06F 16/2308 235/379 |
| 9,031,987 B2 | 5/2015 | Williamson | |
| 9,619,544 B2 * | 4/2017 | Vermeulen | G06F 16/27 |
| 2004/0257985 A1 * | 12/2004 | Sahai | H04L 47/125 370/252 |
| 2008/0162365 A1 * | 7/2008 | Lakkapragada | G06Q 20/04 705/75 |
| 2010/0049646 A1 * | 2/2010 | Pechenik | G06Q 40/06 705/37 |
| 2010/0287114 A1 * | 11/2010 | Bartko | G06Q 40/06 705/36 R |
| 2015/0134475 A1 * | 5/2015 | Matsuda | G06Q 30/06 705/26.7 |
| 2015/0193872 A1 * | 7/2015 | Ivanoff | G16H 50/20 705/38 |
| 2016/0350357 A1 * | 12/2016 | Palmer | G06F 16/2365 |

(Continued)

*Primary Examiner* — Fateh M Obaid
(74) *Attorney, Agent, or Firm* — Lieberman & Brandsdorfer, LLC

(57) ABSTRACT

Embodiments relate to aggregation operations. More specifically, embodiments relate to enforcing an aggregation constraint across a distributed network of compute nodes responding asynchronously. Each compute node individually processes the local partial aggregate value in parallel and asynchronously communicates with a conflict resolution node (CRN).

20 Claims, 11 Drawing Sheets

(56) References Cited

U.S. PATENT DOCUMENTS

| | | | |
|---|---|---|---|
| 2018/0107994 A1* | 4/2018 | Anderson | G06Q 20/227 |
| 2018/0222043 A1* | 8/2018 | Trovero | G06F 16/285 |
| 2018/0357264 A1* | 12/2018 | Rice | G06F 16/2282 |
| 2019/0303845 A1* | 10/2019 | Funderburg | G06Q 10/087 |
| 2020/0058068 A1* | 2/2020 | Gandhi | G06N 7/005 |
| 2020/0143471 A1* | 5/2020 | Jackson | H04L 9/3239 |
| 2020/0250633 A1* | 8/2020 | Vinson | G06Q 20/405 |
| 2021/0312571 A1* | 10/2021 | Mimassi | G06Q 50/12 |

* cited by examiner

SCALABLE ENFORCEMENT OF AGGREGATION CONSTRAINTS WITHIN TRANSACTIONS

BACKGROUND

The present embodiments relate to aggregation operations. More specifically, the embodiments relate to hybrid transactional and analytical processing where aggregation constraints are enforced as part of a transaction.

Data aggregation is a process in which information is gathered and expressed in a summary form. System level constraints are common in many mission critical applications. For example, when traders place orders for securities on behalf of an entity, there are constraints at the trader level, and portfolio balance constraints at the entity level. Another example is when a customer orders a product from a vendor and the vendor wants to ensure that there is available inventory for the order product before accepting the order. These examples are referred to in the art as aggregations, and the constraints are known as aggregation constraints (ACs).

SUMMARY

A system, computer program product, and method are provided to scalably enforce aggregation constraints within transactions.

In one aspect, a system is provided with a processing unit operatively coupled to a memory. An aggregation engine is provided in communication with the processor and operatively coupled to one or more compute nodes. The aggregation engine is provided with tools to perform enforcement of an aggregation constraint. The tools include a receiver, an assessment manager, and a director. The receiver leverages a last committed aggregate value as a current prefix sum for an interval aggregation, and asynchronously receives one or more remotely computed preliminary interval aggregate values from the one or more compute nodes. The assessment manager functions to assess a preliminary interval aggregate responsive to the asynchronous receipt of the preliminary aggregate values. The assessment includes the assessment manager to send the current prefix sum to the one or more compute nodes, and adjust the current prefix sum with the one or more received preliminary interval aggregate values, including selective application of a constraint requirement. The director functions to replace and apply the last committed aggregate value as a refreshed current prefix sum for a subsequent interval aggregation.

In another aspect, a computer program product is provided to perform enforcement of an aggregation constraint. The computer program product is provided with a computer readable storage medium having embodied program code executable by the processor. The program code leverages a last committed aggregate value as a current prefix sum for an interval aggregation, and asynchronously receives one or more remotely computed preliminary interval aggregate values from one or more operatively coupled compute nodes. In addition, the program code assesses a preliminary interval aggregate responsive to the asynchronous receipt of the preliminary aggregate values. The assessment includes sending the current prefix sum to the one or more compute nodes, and an adjustment of the initial prefix sum with the one or more received preliminary interval aggregate values, including selective application of a constraint requirement. Program code is further provided to delegate responsibility of rolling back any violating transactions to the one or more compute nodes in receipt of the current prefix sum to locally evaluated an aggregation constraint, which includes identification of any local transactions in violation of the aggregation constraints and selective application of a rollback protocol to the one or more violating transactions. Program code is provided to replace and apply the last committed aggregate value as a refreshed current prefix sum for a subsequent interval aggregation.

In yet another aspect, a computer implemented method is provided to perform enforcement of an aggregation constraint. A last committed aggregate value is leveraged as a current prefix sum for an interval aggregation. One or more remotely computed preliminary interval aggregate values are asynchronously received from one or more operatively coupled compute nodes. A preliminary interval aggregate is assessed responsive to the asynchronous receipt of the preliminary aggregate values. The assessment includes sending the current prefix sum to the one or more compute nodes, and adjusting the current prefix sum with the one or more received preliminary interval aggregate values, which includes selectively applying a constraint requirement. Responsibility of rolling back any violating transactions is delegated to the one or more compute nodes in receipt of the current prefix sum to locally evaluate an aggregation constraint, including identifying any local transactions violating the aggregation constraint, and selectively applying a rollback protocol to the one or more violating transactions. The last committed aggregate value is replaced and applied as a refreshed current prefix sum for a subsequent interval aggregation.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
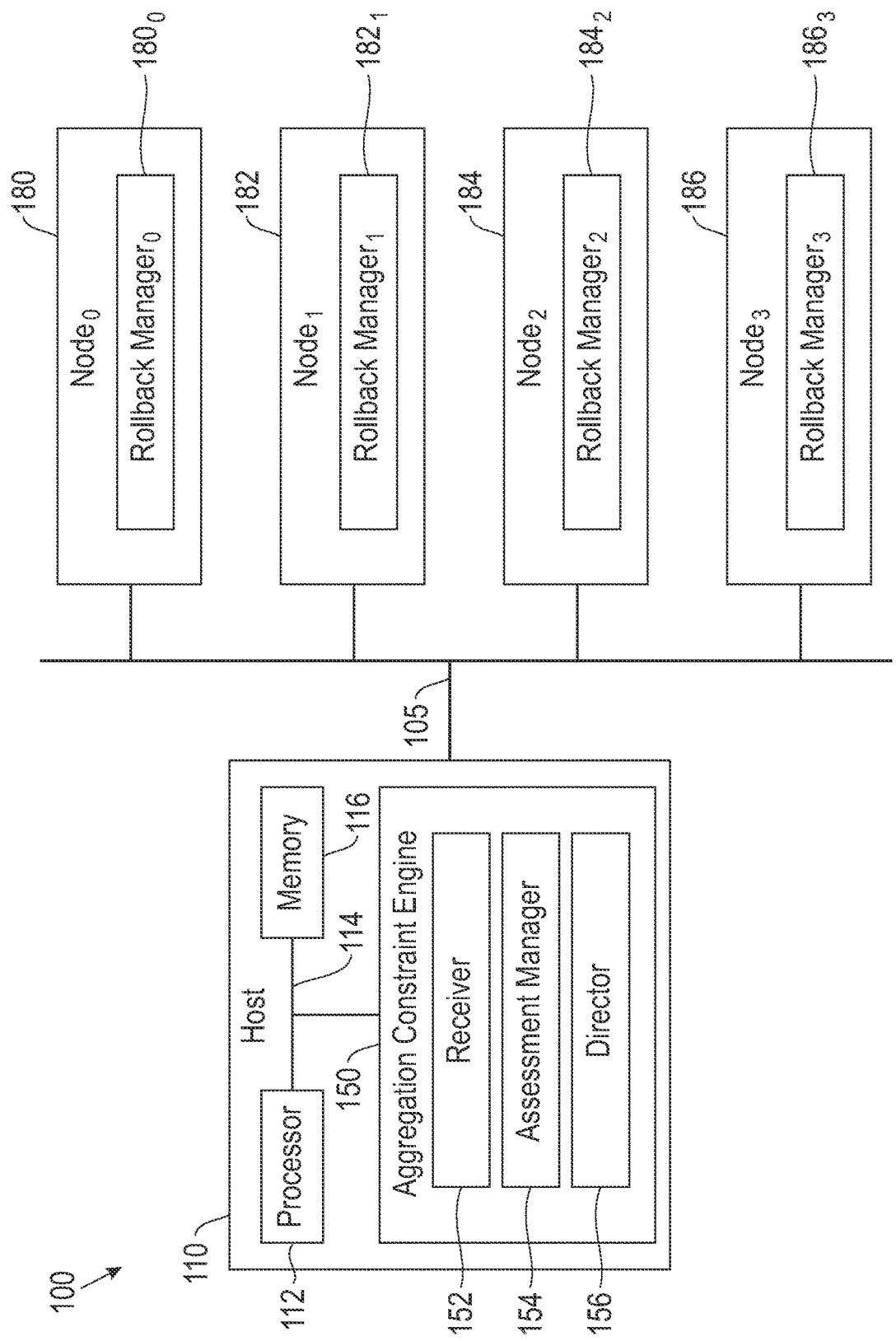
FIG. 1 depicts a schematic diagram of a computer system with an embedded aggregation constraint engine.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A transaction is a contract between two parties, e.g. between a customer and a retailer. When the customer clicks a "submit" button, they are committing, not just in a database management system (DBMS) sense but also in the legal contract sense to purchase the product(s) at an agreed upon price. Conversely, the retailer is committing to supply the purchase product(s) to the customer. However, in reality, the serializable order of these transactions is established after the commit. It is understood in the art that some systems can wait for this order, and some systems cannot wait for this order due to time and resource constraints. In retail application, this could be the sequence in which orders are filled by consuming inventory. It is recognized in the art that constraints can and do get violated, and quite frequently, and such violations are resolved by compensation, e.g. via an apologetic communication or perhaps a coupon. To absolve the supplier, the commit is commonly accompanied by text communicating that the parties agree that the contract for the transaction is contingent on a global state reflecting all concurrent transactions, in a serializable order, not differing too much from the state seen at the time of commit. The problem with this application logic is that it complicates reasoning about database atomicity or durability.

Hybrid transaction and analytical processing (HTAP) is directed at conducting analytics on the same system as transaction processing, and performing analytics within the transactions. True HTAP in a distributed environment is challenging. If a transaction, running on any computer node, can query an entire database state up to that point in time, e.g. serializable order, and subsequently make a modification that might affect the entire database, then that transaction will effectively need to lock the entire database while the transaction runs. Not only can such transactions run for a long time, but their locking behavior excludes other transactions, effectively eliminating concurrency.

Splitting a database into regions and enforcing constraints only within each region is referred to as sharding. Database sharding across distributed compute nodes somewhat eases the problem by partitioning the database into shards and similarly partitioning the transaction workload, so that most transactions are local to a single shard. However, often aggregation constraints spanning multiple nodes need to be enforced, and this commonly forces escrowing transactions while aggregating across shards.

In the DBMS, data is stored in one or more data containers with each container having records. As shown and described herein the database is modeled as a logical chain of state modifications, referred to herein as deltas. The state modifications are made by programs called transactions that can logically read the current database state, and apply transaction logic to perform the transaction. Each transaction runs local to a compute node, but may query the database state across compute nodes. In one embodiment, the delta produced at each compute node is referred to as a sub-chain and the database chain is an interleaving of these sub-chains. Transactions push aggregation constraints (ACs) in both directions, e.g. orders and re-stocking, making push down of AC enforcement challenging. Just because k transactions together satisfy the AC does not mean every prefix of those transactions in serial order satisfies the AC.

A system, method and computer program product to scalably enforce aggregation constraints within transactions are provided, with embodiments, discussed below in detail. As shown and described, all nodes can run transactions that modify the entire database, e.g. eliminating sharding, yet enforce ACs.

Referring to FIG. 1, a schematic diagram of a computer system with an embedded aggregation constraint engine (100) is depicted. As shown, a server (110), also referred to as a host, is provided in communication with a plurality of compute nodes (180), (182), (184), and (186) across a network connection (105). Although four compute nodes are shown, the quantity should not be considered limiting. The server (110) is configured with a processing unit (112), e.g., processor, in communication with memory (116) across a bus (114). The server (110) is shown with an aggregation constraint engine (150) configured with one or more tools to perform enforcement of an aggregation constraint and apply a current aggregation value, as adjusted, to a subsequent interval aggregation. Intervals define a time period in which transactions are considered as a set for the purpose of constraint enforcement validation. More specifically, the compute nodes (180), (182), (184), and (186) communicate with the server (110), and in an embodiment, with other devices or components, via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The aggregation constraint engine (150) is shown herein configured with tools to perform enforcement of an aggregation constraint. The tools include, but are not limited to, a receiver (152), an assessment manager (154), and a director (156). Although the tools are illustrated in FIG. 1 as embedded in the aggregation constraint engine (150), in other embodiments one or more of the tools (152), (154), and (156) may be apart or external from the aggregation constraint engine (150).

The receiver (152) is shown herein embedded in the aggregation constraint engine (150). In an embodiment, enforcement of the aggregation constraint is initiated with a signal broadcast from the server (110), e.g. coordinating node, to the compute nodes (180), (182), (184), and (186). Intervals are defined for the purpose of constraint enforcement, and the transactions contained within the interval(s) are validated. The receiver (152) leverages a last committed aggregate value as an initial prefix sum for an interval aggregation, and asynchronously receives one or more remotely computed preliminary interval aggregate values. In one embodiment, the last committed aggregate value is received from a query processor. The assessment manager (154), operatively coupled to the receiver (152), assesses the preliminary interval aggregate in response to the asynchronous receipt of the preliminary interval aggregate values from the compute nodes (180), (182), (184), and (186). The assessment includes an adjustment of the initial prefix sum with one or more preliminary interval aggregate values received from one or more of the compute nodes (180), (182), (184), and (186), and sending the adjusted prefix sum to one or more of the compute nodes (180), (182), (184), and (186) to enable local validation of the adjusted prefix sum. The adjustment includes the assessment manager (154) to selectively apply a constraint requirement. As part of the assessment and corresponding assessment process, the compute nodes (180), (182), (184), and (186) locally evaluate an aggregation constraint. The evaluation includes identification of any local transactions that violate the aggregation constraint, and selective application of a rollback protocol to the violating transaction(s), as shown and described below.

As shown herein, each compute node is shown with a local rollback manager to delegate responsibility of rolling back any constraint violating transactions to a corresponding compute node local to the violating transaction. For descriptive purposes compute node$_0$ (180) is shown with rollback manager$_0$ (180$_0$), compute node$_1$ (182) is shown with rollback manager$_1$ (182$_1$), compute node2 (184) is shown with rollback manager$_2$ (184$_2$), and compute node$_3$ (186) is shown with rollback manager$_3$ (186$_3$). The rollback takes place local to the compute node wherein the violation transaction emanates and remotely from the server (110). More specifically, as one or more of the local compute nodes (180), (182), (184), or (186) receives the adjusted prefix sum, they locally evaluate an aggregation constraint. The evaluation includes identification of any local transaction that is in violation of the aggregation constraint, and selective application of a rollback protocol to the violating transaction(s). It is understood that each compute node has one or more local transactions for a corresponding interval. For example, in one interval compute node (180) may have three transactions and compute node (186) may have one transaction. Rollback manager$_0$ (180$_0$) may modify an order of processing the transactions within compute node$_0$ (180), e.g. intra-node transaction processing, for the interval, e.g. interval batch, so as to mitigate application of a rollback protocol. Rollback functionality is delegated to the compute nodes via local rollback managers. The rollback protocol omits the transaction that violates the constraint. Accordingly, the rollback manager (156) supports and enables modification or intra-node and inter-node processing of transactions in order to mitigate application of the rollback protocol.

The director (156) is shown herein operatively coupled to the assessment manager (154), and functions to adjust a current aggregate value with one or more received prefix sum adjustments. The current aggregate value is maintained by the director (156) through an incremental adjustment of an interval partial aggregate value with a final partial aggregate that is subject to a selective adjustment for any rollback transactions. The receiver (152) and the assessment manager (154) process the prefix sum in parallel with the interval partial aggregate value, with the assessment manager (154) making adjustments to the prefix sum in response to asynchronous communications. The director (156) applies the current aggregate value to a next interval aggregation.

The interval aggregation shown and described herein is directed at the server (110), also referred to herein as a conflict resolution node (CRN) and the embedded aggregation constraint engine (150). As shown herein, the tools, including the receiver (152), the assessment manager (154), and the director (156) function to asynchronously process transactions for an aggregation for a defined time interval. As shown and described, rollback operations are performed locally in the compute nodes, e.g. (180), (182), (184), and (186), with the compute nodes communicating a revised partial aggregate or interval aggregate with the CRN (110). The aggregation tools (152), (154), and (156) are shown embedded within the aggregation constraint engine (150) local to the server (110). In an embodiment, the tools may be implemented in two or more compute nodes connected across a network connection (105). In another embodiment, the aggregation tools (152), (154), and (156) function to process transactions in support of an aggregation and an aggregation constraint for an interval.

Types of devices and corresponding systems that can utilize the aggregation constraint engine (150) range from small handheld devices, such as handheld computer/mobile telephone to large mainframe systems. Examples of the handheld computer include personal digital assistants (PDAs), personal entertainment devices, such as MP4 players, portable televisions, and compact disc players. Other examples of information handling systems include a pen or tablet computer, a laptop or notebook computer, a personal computer system, and a server. As shown, the various devices and systems can be networked together using a computer network (105). Types of computer networks (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores. The nonvolatile data store can be a component that is external to the various devices and systems or can be internal to one of the devices and systems.

The device(s) and system(s) employed to support the aggregation constraint engine (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device, or other devices that include a processor and memory.

Figure 2:
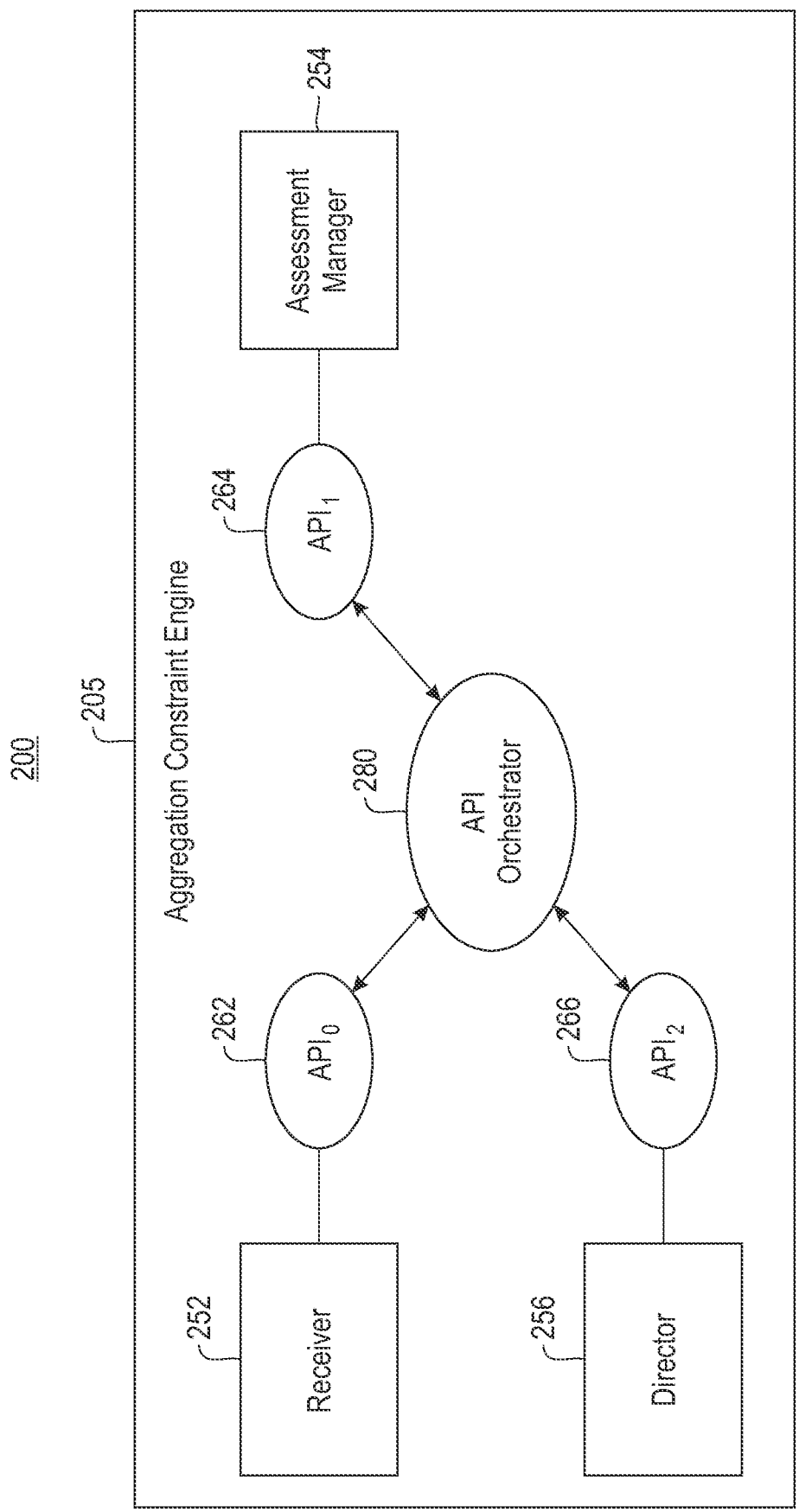
FIG. 2 depicts a block diagram illustrating tools of the aggregation constraint engine and their associated APIs.

An Application Program Interface (API) is understood in the art as a software intermediary between two or more applications. With respect to the aggregation constraint engine (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools is embedded within the aggregation constraint engine (205), with the tools including the receiver (152) shown in FIG. 2 as (252) associated with $API_0$ (262), the assessment manager (154) shown in FIG. 2 as (254) associated with $API_1$ (264), and the director (156) shown in FIG. 2 as (256) associated with $API_3$ (266). Each of the APIs may be implemented in one or more languages and interface specifications. $API_0$ (252) provides functional support to leverage a last committed aggregate value as an initial prefix sum for an interval aggregation, which includes asynchronously receiving one or more remotely computed preliminary interval aggregate values; $API_1$ (254) provides functional support to assess a preliminary aggregate value for the interval based on the asynchronous receipt of preliminary aggregate values; and $API_2$ (256) provides functional support to adjust a current aggregate value within one or more received prefix sum adjustments. As shown, each of the APIs (252), (254), and (256) are operatively coupled to an API orchestrator (280), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
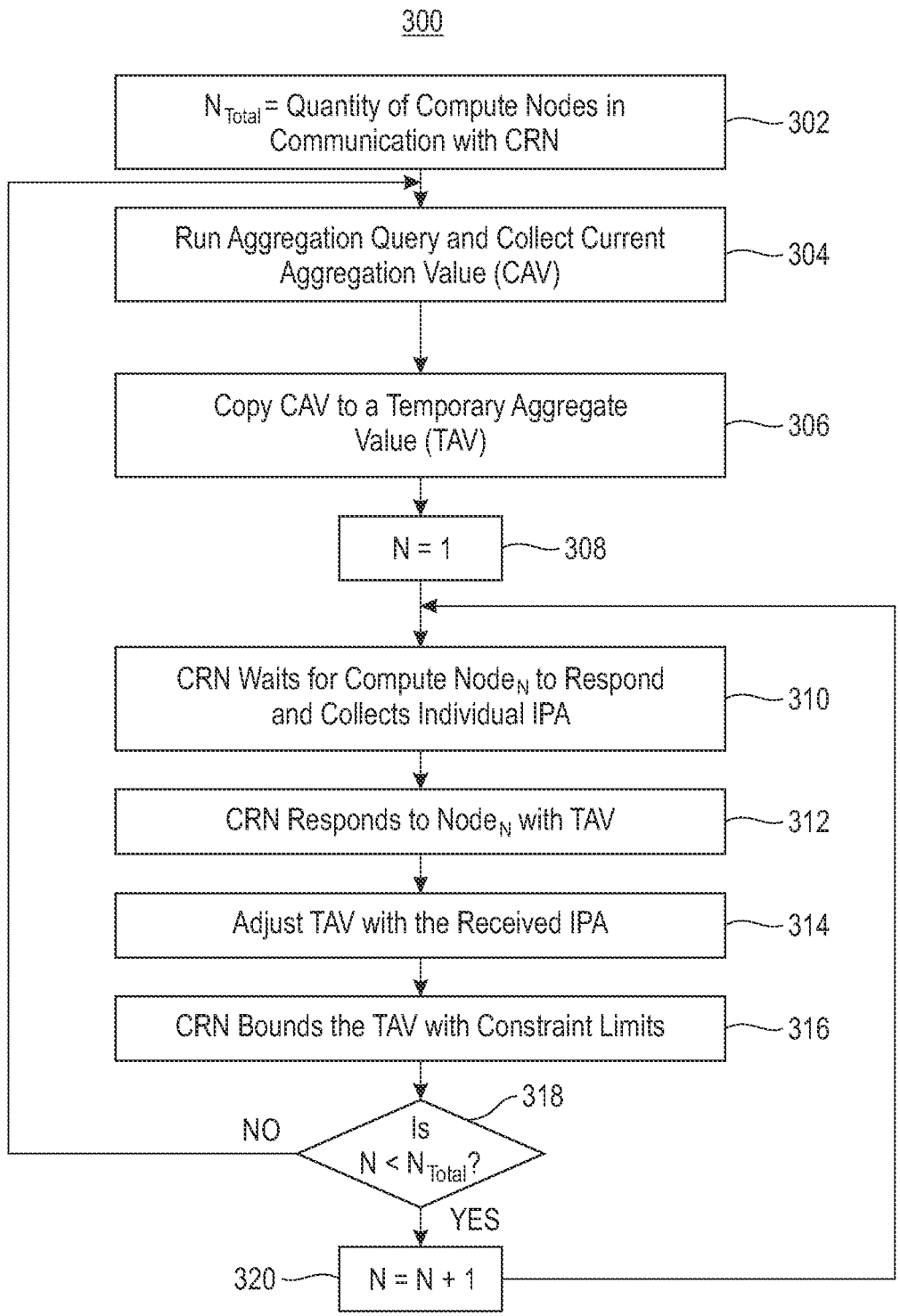
FIG. 3 depicts a flow chart illustrating a conflict resolution node (CRN) performing enforcement of an aggregation constraint.

Referring to FIG. 3, a flow chart (300) is provided illustrating a conflict resolution node (CRN) performing enforcement of an aggregation constraint. The variable $N_{Total}$ is assigned to represent a quantity of compute nodes in communication with the CRN (302). As shown, an aggregation query is run and a current aggregation value (CAV) is collected (304). The steps involved in performing the collection at step (304) include collecting committed partial aggregates from each compute node in communication with the CRN for all prior transactions that have been resolved, and adjusting the CAV based on the collected and committed partial aggregates. It is understood in the art that the query of the compute nodes performed at step (304) is expensive, and as such in an embodiment this step is infrequently repeated. Following step (304), the CAV is copied to a temporary aggregate value (TAV) (306). A node counting variable, N, is initialized (308). The node counting variable is utilized to evaluate each of the compute nodes in communication with the CRN and their corresponding aggregate values. Each compute node, e.g. $Node_N$, has a corresponding interval partial aggregate (IPA), which represents the aggregate value for an individual compute node for a time interval, e.g. 1 sec. The compute nodes individually and separately communicate with the CRN during any given time interval, where the time interval is not limiting. However, to ensure that each compute node maintains communication with the CRN, a count of the compute nodes is maintained for each interval.

Following step (308), the CRN waits for each compute node to respond with their individual IPA. As each compute node responds, the CRN collects the IPA from $Node_N$ (310). The CRN responds to $Node_N$ with the TAV (312), and adjusts the TAV with the received IPA (314). In one embodiment, the adjustment at step (314) is a mathematical operation either increasing or decreasing the TAV based on the value of the received IPA. If the TAV is set to be a negative value from the adjustment at step (314), then the CRN bounds the TAV with constraint limits (316), which in an embodiment, sets the TAV to zero so that the TAV does not violate the constraint. In an embodiment, instead of responding to $Node_N$ at step (312), the CRN may selectively re-order processing the compute nodes and their corresponding transactions in order to mitigate rollback of any transactions. Accordingly, as each of the compute nodes in communication with the CRN respond with their individual IPA, the CRN adjusts the TAV.

Following step (316), the CRN determines if each of the compute nodes in communication with the CRN has responded with their individual IPA for the time interval (318). As shown herein, the logic assesses if the value of the compute node counting variable is less than the quantity of compute nodes, e.g. $N_{Total}$. A positive response to the determination at step (318) is followed by an increment of the compute node counting variable, N, (320) and a return to step (310), and a negative response is an indication that each of the compute nodes has reported to the CRN for the time interval. Following the negative response to the determination at step (318), the process returns to step (304) for the next time interval and processing the aggregation, and more specifically, processing the IPA from the compute nodes. In an embodiment, following the positive response to the determination at step (318), the process may adjust the CAV with a revised IPA, see FIG. 5, and return to step (306) for the next time interval and processing the aggregation.

Figure 4:
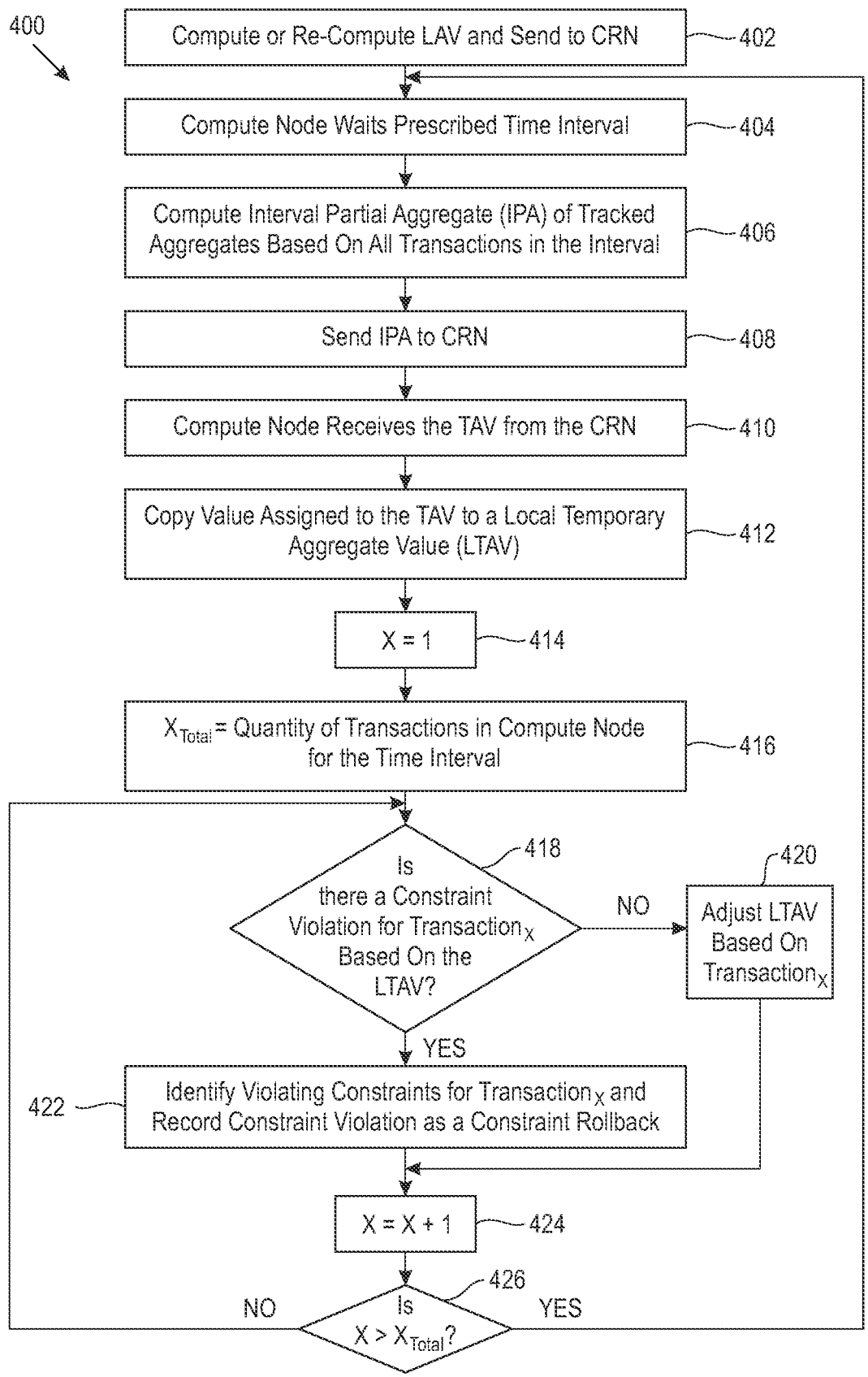
FIG. 4 depicts a flow chart illustrating a process for locally computing an interval partial aggregate for a compute node in communication with the CRN.

As shown and described in FIG. 3, the compute nodes individually and asynchronously communicate with the CRN by responding with their IPAs. The CRN processes the IPAs of the nodes in the order of compute node communication with the CRN. Referring to FIG. 4, a flow chart (400) is provided to illustrate a process for locally computing an interval partial aggregate for a compute node in communication with the CRN. Although the process and steps shown herein are directed at a single node, it is understood that two or more compute nodes, e.g. $N_{Total}$, are in communication with the CRN and each compute node is individually processing in parallel with other nodes, e.g. $Node_N$ is processing in parallel with $Node_{N+1}$, $Node_{N+2}$, etc. As shown at step (302) the current aggregation value (CAV) is collected, which may take place by the local node computing or re-computing their committed local aggregate value (LAV) and sending it to the CRN upon request (402). The process shown and described herein is repeated by each compute node in communication with the CRN for each separate and defined time interval. The compute node waits for a fixed delay or utilizes a synchronized time clock interval (404), computes an interval partial aggregate (IPA) of tracked aggregates based on all transactions in the interval (406), and sends the IPA to the CRN (408). As shown in FIG. 3, the IPA is received by the CRN at step (310). Following step (408), the compute node receives the TAV from the CRN (410), e.g. see step (312), and copies the value assigned to the TAV to a local temporary aggregate value (LTAV) (412).

Each compute node subjects the transaction(s) in the time interval to re-processing. As shown herein, a transaction counting variable, X, is initialized (414), and the variable $X_{Total}$ is assigned to represent the transactions in the compute node for the time interval (416). It is then determined if there is a constraint violation for $transaction_X$ based on the LTAV (418). A positive response to the determination at step (418) is followed by identifying the constraint for $transaction_X$ as a violation or violation failure, and recording the constraint violation as a constraint-rollback, e.g. rollback $transaction_X$, (422). However, a negative response to the determination at step (418) is followed by adjusting the LTAV based on transaction$_X$ (420). More specifically, at step (420) the committed part aggregate is adjusted based on transaction$_X$. Following either step (420) or step (422), the transaction counting variable, X, is incremented (424). It is then determined if all of the transactions for Node$_N$ have been processed (426). A negative response to the determination at step (426) is followed by a return to step (418) for continued processing of one or more transactions for Node$_N$, and a positive response triggers a return a return to step (404) in preparation to process the up-coming next interval. Accordingly, as shown herein, transactions or transaction decisions directed to rollback are conducted locally, e.g. local to Node$_N$.

Figure 5:
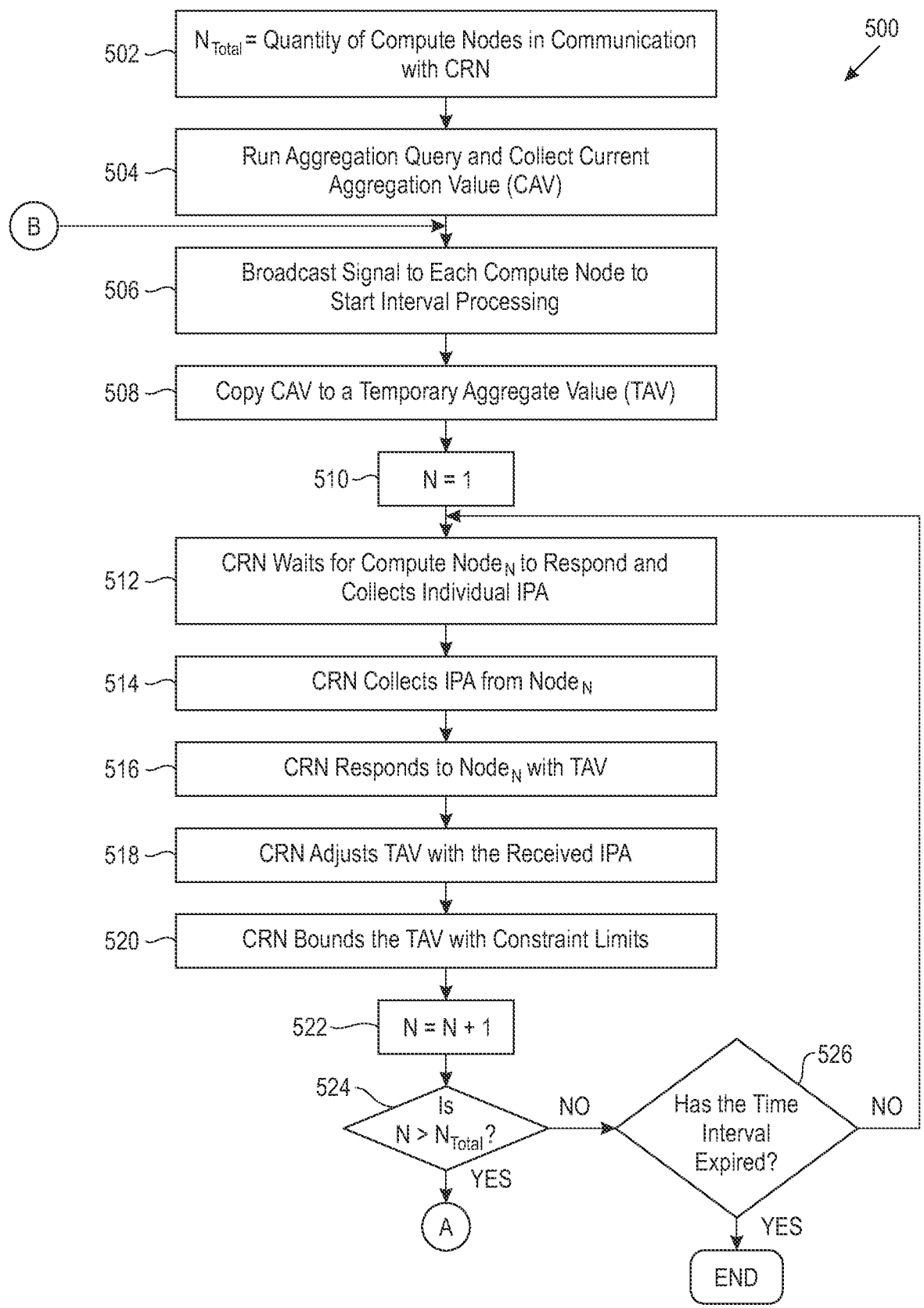
FIG. 5 depicts a flow chart illustrating an optimization of the aggregation by the (CRN), as shown and described in FIG. 3.
Figure 5:
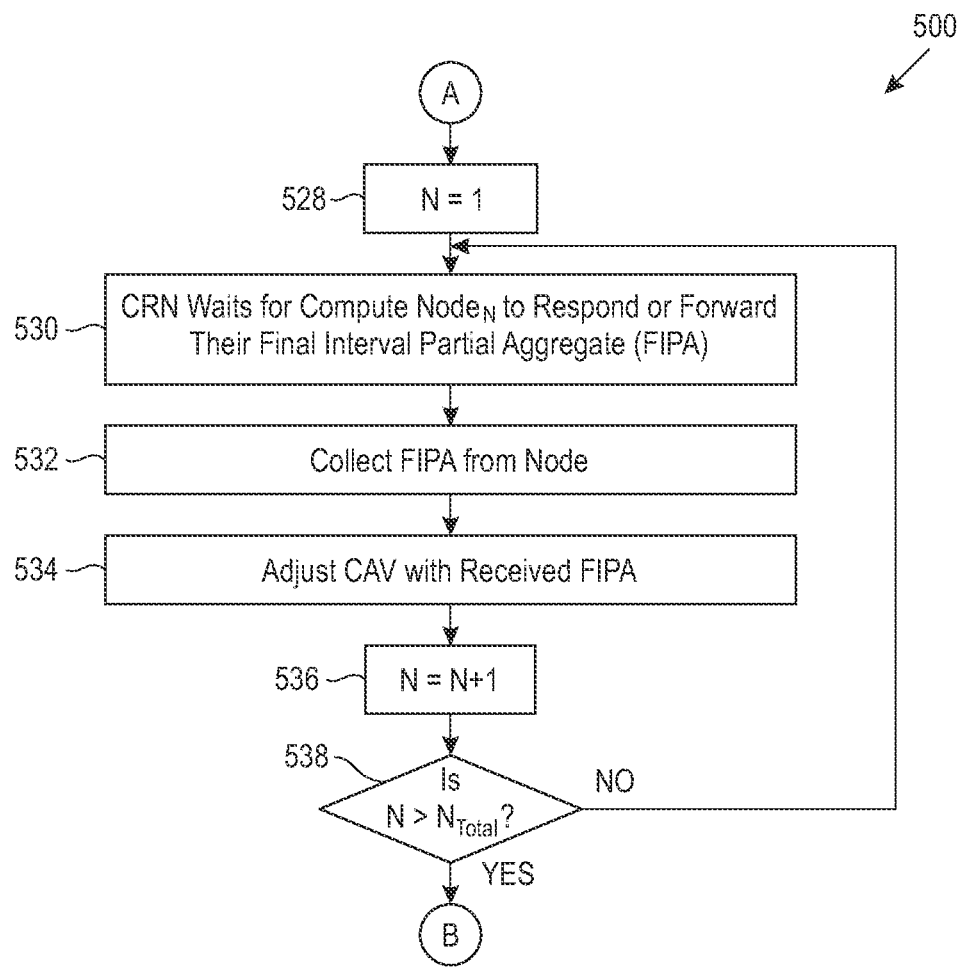

Referring to FIG. 5, a flow chart (500) is provided to illustrate an optimization of the aggregation by the (CRN), as shown and described in FIG. 3. Similar to the aggregation shown and described in FIG. 3, the variable N$_{Total}$ is assigned to represent a quantity of compute nodes in communication with the CRN (502), followed by running an aggregation query and collecting a current aggregation value (CAV) (504). The steps involved in performing the collection at step (504) include collecting committed partial aggregates from each local compute node in communication with the CRN for all prior transactions that have been resolved, and adjusting the CAV based on the collected and committed partial aggregates. In one embodiment, the compute node(s) may receive a signal from the CRN to compute or re-compute the Interval Partial Aggregate for all prior transaction that have been resolved. It is understood in the art that the query of the compute nodes performed at step (504) is expensive, and as such in an embodiment this step is infrequently repeated.

As suggested in FIG. 3, the CRN performs the aggregation for a time interval, which in one embodiment is a configurable value. Following step (504), a signal is broadcast to each of the compute nodes in communication with the CRN to start interval processing (506). The signal broadcast captures the state of the aggregation processing with the compute nodes. The CAV is copied to a temporary aggregate value (TAV) (508). A node counting variable, N, is initialized (510). The node counting variable is utilized to evaluate each of the compute nodes in communication with the CRN and their corresponding aggregate values for the time interval associated with the signal broadcast. Each compute node, e.g. Node$_N$, has a corresponding interval partial aggregate (IPA), which represents the aggregate value for an individual compute node for the time interval, e.g. 1 sec. The compute nodes individually and separately communicate with the CRN during the time interval. To ensure that each compute node maintains communication with the CRN, a count of the compute nodes is maintained for each interval.

Following step (510), the CRN waits for each compute node to respond to their individual IPA (512). As each compute node responds, the CRN collects the IPA from node$_N$ (514). The CRN responds to Node$_N$ with the TAV (516), and adjusts the TAV with the received IPA (518). In one embodiment, the adjustment at step (518) is a mathematical operation either increasing or decreasing the TAV based on the value of the received IPA. If the TAV is set to be a negative value from the adjustment at step (518), then the CRN bounds the TAV with constraint limits (520), which in an embodiment, sets the TAV to zero so that the TAV does not violate the constraint. In an embodiment, instead of responding to Node$_N$ at step (516), the CRN may selectively re-order processing the compute nodes and their corresponding transactions in order to mitigate rollback of any transactions. Accordingly, as each of the compute nodes in communication with the CRN respond with their individual IPA, the CRN adjusts the TAV.

Following step (520), the node counting variable, N, is incremented (522), and the CRN determines if each of the compute nodes in communication with the CRN has responded with their individual IPA for the time interval (524). A negative response to the determination at step (524) is followed by a return to step (512), and a positive response is an indication that each of the compute nodes has reported to the CRN for the time interval. Alternatively, prior to returning to step (512), it may optionally be determined whether the time interval for the aggregation has expired (526). A negative response to the determination at step (526) is followed by the CRN continuing to listen to responding compute nodes as shown by a return to step (512) However, a positive response to the determination at steps (524) is followed by re-initializing the compute node counting variable, N, (528). The CRN waits for all of the compute nodes to respond or forward to the CRN their Final Interval Partial Aggregate (FIPA) for the time interval. Details on the FIPA assessment are shown and described in FIG. 6.

It is understood that the compute nodes may communicate with the CRN in any order, although in an embodiment, the order in which the compute nodes communicate with the CRN is tracked. As the compute nodes communicate with the CRN, the FIPA for Node$_N$ is collected (532), and the CRN uses the collected FIPA to adjust the CAV with the received FIPA (534). Thereafter, the node counting variable, N, is incremented (536) and it is determined if the CRN has received the FIPA from each of the compute nodes in communication with the CRN or whether the time interval for the aggregation is completed (538). A positive response to the determination at step (538) is followed by a return to step (506) for aggregation processing of the next time interval, and a negative response is followed by a return to step (530). Accordingly, as shown herein, the optimization of the CRN functionality is directed at the interval broadcast signal and the adjustment of the CAV with the FIPA received from the participating compute nodes.

Figure 6:
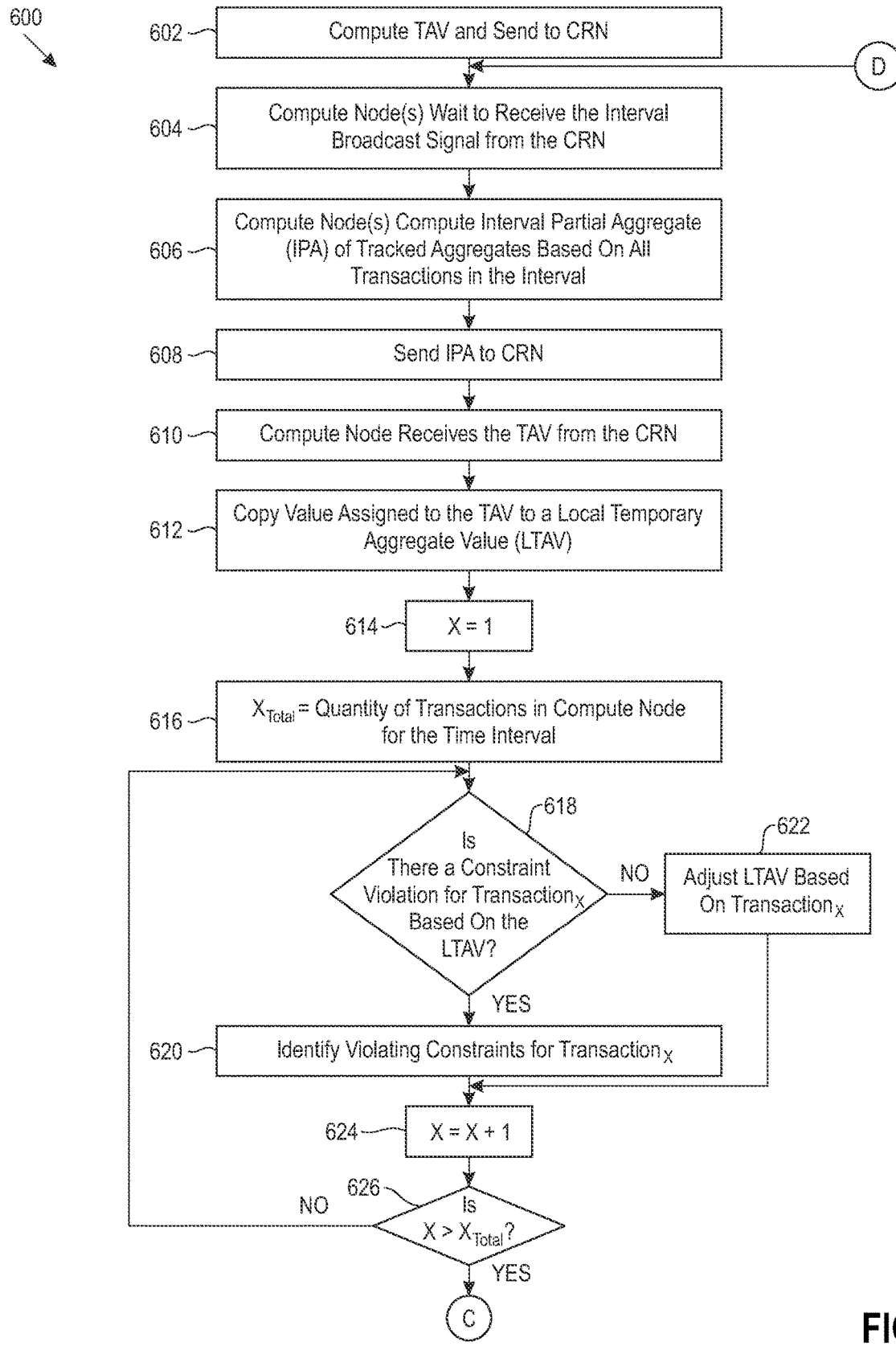
FIG. 6 depicts a flow chart illustrating an optimization of the process for locally computing an interval partial aggregate for a compute node in communication with the CRN, as shown and described in FIG. 4.
Figure 6:
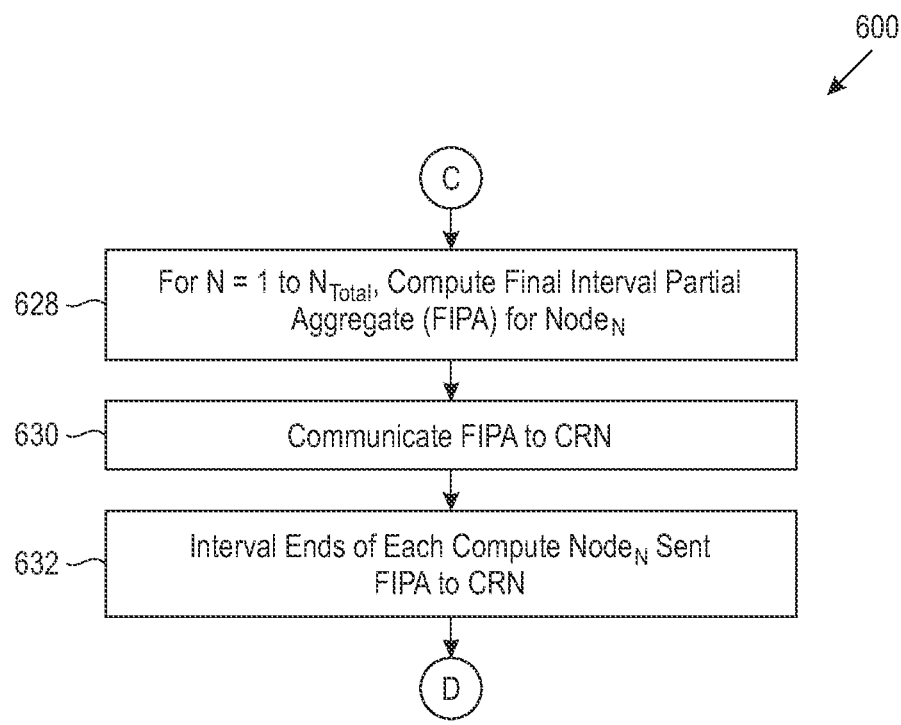

Referring to FIG. 6, a flow chart (600) is provided to illustrate an optimization of the process for locally computing an interval partial aggregate for a compute node in communication with the CRN, as shown and described in FIG. 4. Although the process and steps shown herein are directed at a single node, it is understood that two or more nodes, e.g. N$_{Total}$, are in communication with the CRN and each compute node is individually processing in parallel with other nodes, e.g. Node$_N$ is processing in parallel with Node$_{N+1}$, Node$_{N+2}$, etc. The current aggregation value (CAV) is collected from the local node(s), which may take place by the compute node(s) computing their local aggregate and sending it to the CRN upon request (602). After the compute node(s) receive the interval broadcast signal from the CRN (604), the compute node(s) compute an interval partial aggregate (IPA) of tracked aggregates based on all transactions in the interval (606), and send the IPA to the CRN (608). As shown in FIG. 5, the IPA is received by the CRN at step (516). Following step (608), the compute node receives the TAV from the CRN (610), e.g. see step (518), and copies the value assigned to the TAV to a local temporary aggregate value (LTAV) (612).

Each compute node subjects the transaction(s) in the time interval to re-processing. As shown herein, a transaction counting variable, X, is initialized (614), and the variable X$_{Total}$ is assigned to represent the transactions in the compute node, e.g. Node$_N$, for the time interval (616). It is then determined if there is a constraint violation for transaction$_X$ based on the LTAV (618). A positive response to the determination at step (618) is followed by identifying the constraint for transaction$_X$ as a violation or violation failure, and recording the constraint violation as a constraint-rollback, e.g. rollback transaction$_{X}$, (620). The recordation at step (620) is an indication that transaction$_X$ is an uncommitted transaction. In an embodiment, instead of the recordation at step (620), a rollback of transaction$_X$ may be performed, with the rollback setting the LTAV to zero. However, a negative response to the determination at step (618) is followed by adjusting the LTAV based on transaction$_X$ (622). More specifically, at step (622) the committed part aggregate is adjusted based on transaction$_X$. Following either step (620) or step (622), the transaction counting variable, X, is incremented (624). It is then determined if all of the transactions for Node$_N$ have been processed (626). A negative response to the determination at step (626) is followed by a return to step (618) for continued processing of one or more transactions for Node$_N$, and a positive response concludes the node transaction processing. In an embodiment, the aggregation processing shown at steps (618)-(622) may assess all of the transactions from Node$_N$ as a group, which includes sorting the transactions for the time interval to minimize rollback of any transactions that may otherwise be subject to the rollback. Accordingly, as shown herein, transactions or transaction decisions directed to rollback are conducted locally, e.g. local to Node$_N$.

After all of the transactions for Node$_N$ have been processed, as shown by a positive response to the determination at step (626), the Final Interval Partial Aggregate (FIPA) is computed for Node$_N$ (628), with the FIPA being the difference of the LTAV assessed at steps (620) or (622) and the TAV received from the CRN at step (610). The FIPA is communicated to the CRN (630), see step (536) of FIG. 5. After each of the compute nodes have sent their FIPA to the CRN, or at the end of the time interval for aggregation processing (632), the process returns to step (604) to start the aggregation for the next time interval, without re-computing the full aggregate. Accordingly, aggregations are performed locally by the respective compute nodes for each time interval, and are optimized to include an assessment and communication of the individual FIPA from each compute node to the CRN.

The aggregation processes shown in FIGS. 4 and 6 illustrate transaction processing performed locally at each of the compute nodes. Although the processes are directed and illustrate a single compute node, the compute nodes each run the local partial aggregation queries in parallel and asynchronously communicate with the CRN. Accordingly, the processes and steps shown and described in FIGS. 4 and 6, demonstrate parallel transaction processing. Similarly, the CRN communicates with the compute nodes in parallel running a streaming query to maintain the running aggregate of each local node, e.g. to track availability of inventory for each product.

Aspects of the aggregation engine and its associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the system and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
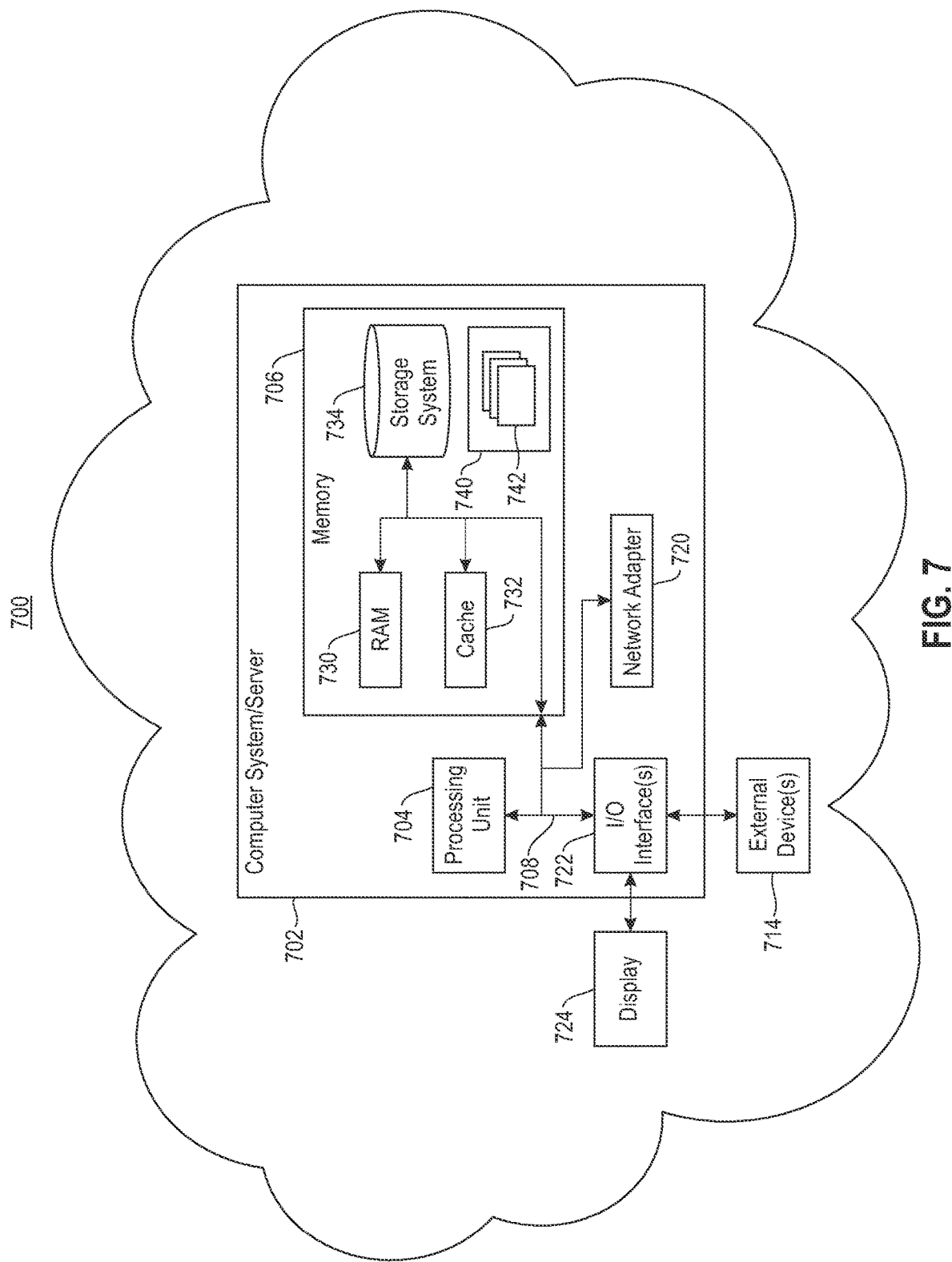
FIG. 7 is a block diagram illustrating an example of a computer system/server of a cloud based support system, to implement the process described above with respect to FIG. 1.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to store and analyze data. For example, the set of program modules (742) may include the modules configured as a translator in order to translate a query involving a distinct aggregate into a query that does not involve a distinct aggregate as described in FIG. 1.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (702) is a node (710) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
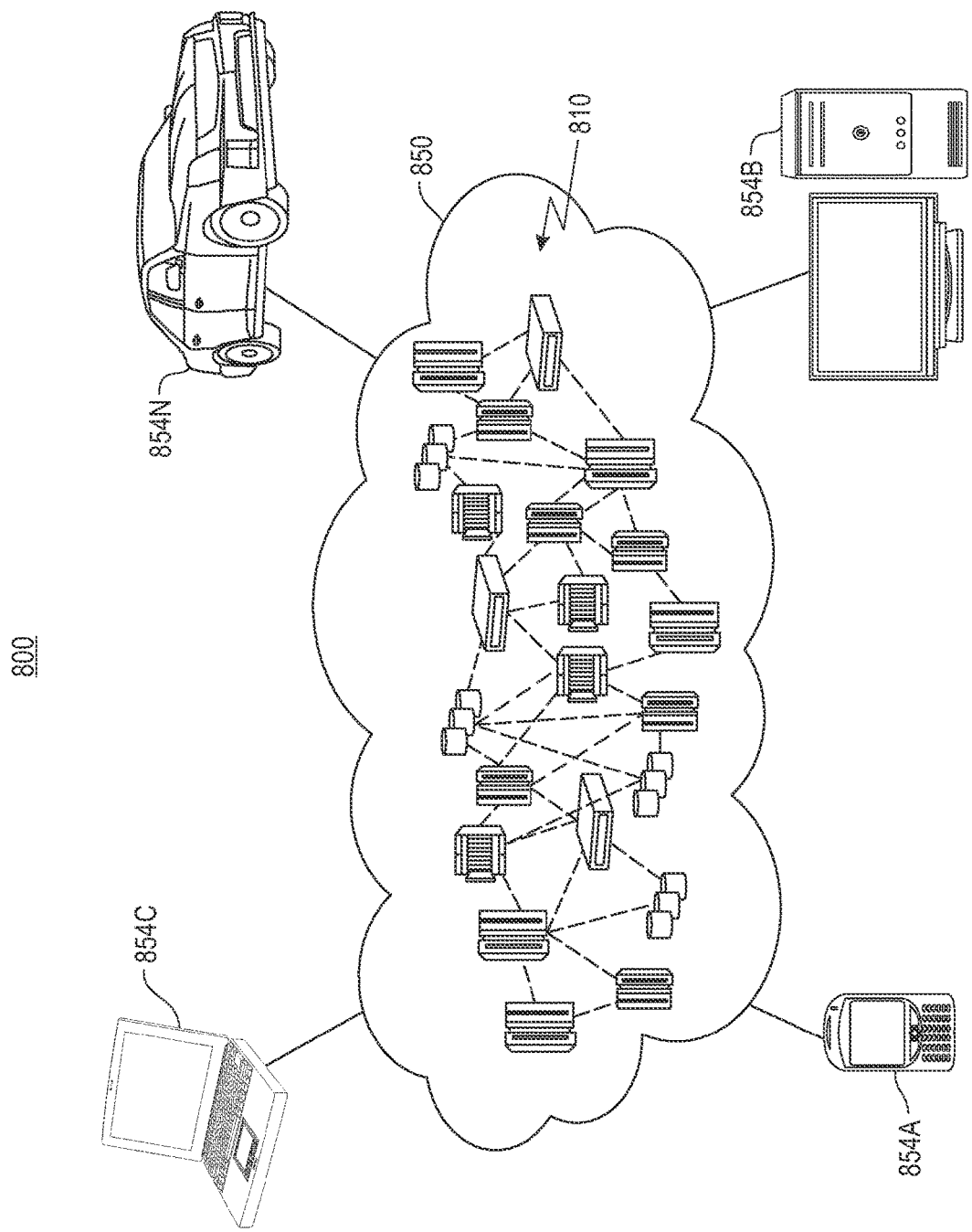
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (855A), desktop computer (855B), laptop computer (855C), and/or automobile computer system (855N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (855A-N) shown in FIG. 8 are intended to be illustrative only and that the cloud computing environment (850) can communicate with any type of computerized device over any type of network and/or network addressable connection (e.g., using a web browser).

Figure 9:
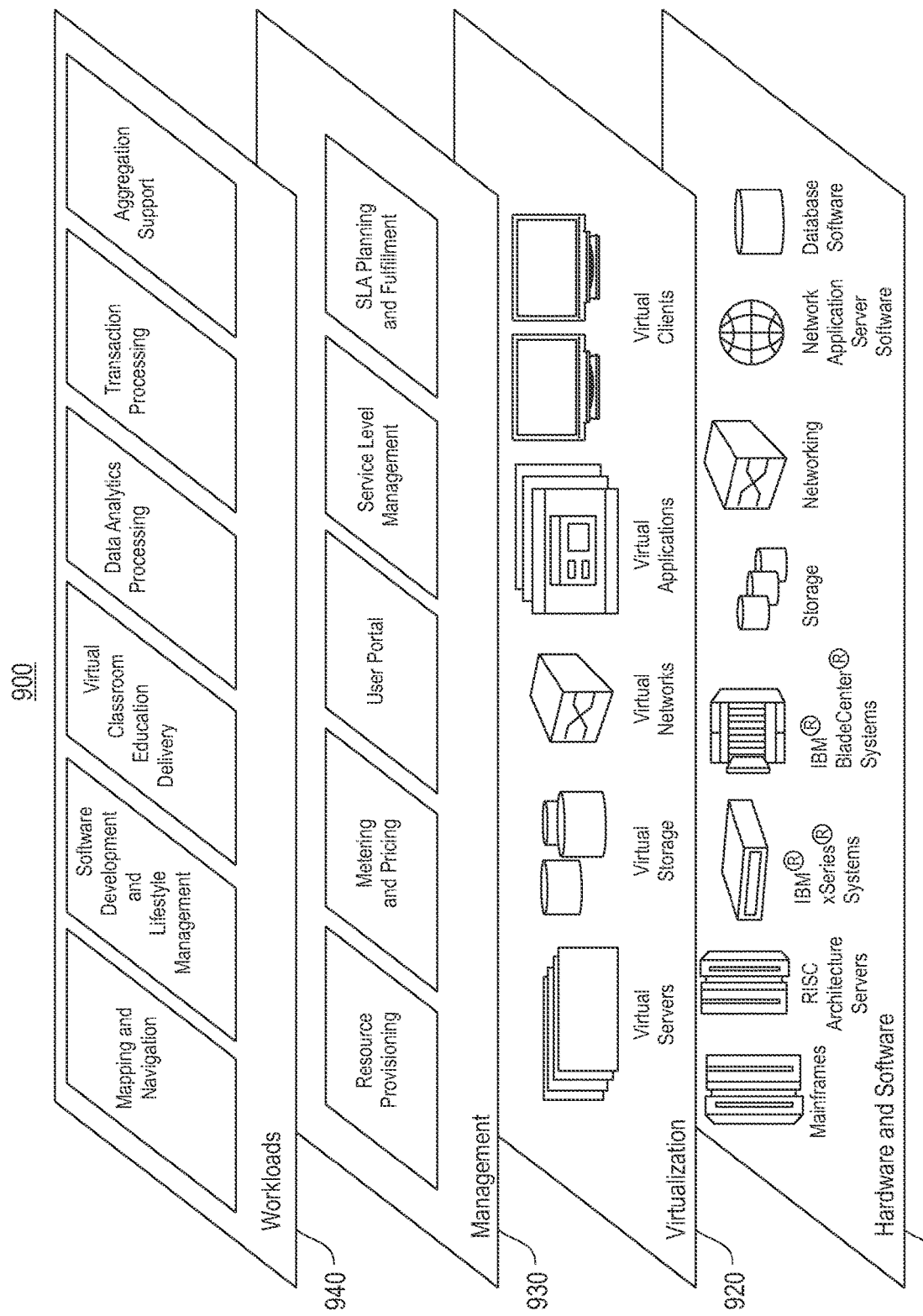
FIG. 9 depicts a block diagram illustrating a set of functional abstraction model layers provided by the cloud computing environment.

Referring now to FIG. 9, a set of functional abstraction layers provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and aggregation support. Specifically, the workload layer (940) supports the aggregation engine disclosed above in FIG. 1 to provide asynchronous assessment and processing of interval aggregates in a shared resource environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A computer system comprising:
   a computer processor operatively coupled to computer memory;
   an aggregation constraint engine in communication with the computer processor and computer memory and operatively coupled to one or more compute nodes, the aggregation constraint engine configured to enforce an aggregation constraint, including to access program code of the computer memory and process the program code with the computer processor to:
      leverage a last committed aggregate value as a current prefix sum for an interval aggregation;
      asynchronously receive one or more remotely computed preliminary interval aggregate values from the one or more compute nodes;
      assess a preliminary interval aggregate responsive to the asynchronous receipt of the preliminary aggregate values;
      adjust the current prefix sum with the one or more received preliminary interval aggregate values, including selective application of a constraint requirement; and
      send the adjusted prefix sum to the one or more compute nodes;
   a rollback manager configured to access the program code of the computer memory and process the program memory with the computer processor to run on the one or more compute nodes in receipt of the adjusted prefix sum to locally evaluate the aggregation constraint, including identify any local transactions violating the aggregation constraint, and selectively apply a rollback protocol to the one or more violating transactions; and
   a director configured to access the program code of the computer memory and process the program memory with the computer processor to replace the last committed aggregate value with a refreshed current prefix sum and apply the refreshed current prefix sum for a subsequent interval aggregation.

2. The computer system of claim 1, wherein the director is configured to access the program code of the computer memory and process the program memory with the computer processor to maintain the last committed aggregate value by an incremental adjustment with a final interval aggregate value selectively adjusted for any rolled-back transactions provided by the one or more compute nodes.

3. The computer system of claim 2, wherein the aggregate constraint engine is configured to access the program code of the computer memory and process the program memory with the computer processor to:
   process the current prefix sum in parallel with the final interval aggregate value; and
   adjust the current prefix sum responsive to asynchronous communications to mitigate application of the rollback protocol for an interval batch.

4. The computer system of claim 1, wherein the interval aggregation constraint enforcement is initiated with a broadcast signal from a coordinating node to the one or more compute nodes.

5. The computer system of claim 1, wherein the rollback manager is configured to access the program code of the computer memory and process the program memory with the computer processor to modify an order of intra-node transaction processing for the one or more compute nodes for an interval batch to mitigate application of the rollback protocol.

6. The computer system of claim 1, wherein the aggregation constraint engine is configured to access the program code of the computer memory and process the program memory with the computer processor to modify an order of processing one or more interval aggregate responses to mitigate application of the rollback protocol for an interval batch.

7. A computer program product to perform enforcement of an aggregation constraint, the computer program product comprising:
   a computer readable storage medium having program code embodied therewith, the program code executable by a computer processor to read and execute the program code to:
      leverage a last committed aggregate value as a current prefix sum for an interval aggregation;
      asynchronously receive one or more remotely computed preliminary interval aggregate values from one or more operatively coupled compute nodes;
      assess a preliminary interval aggregate responsive to the asynchronous receipt of the preliminary aggregate values, the assessment including:
         adjusting the current prefix sum with the one or more received preliminary interval aggregate values, including selectively applying a constraint requirement; and
         sending the adjusted prefix sum to the one or more compute nodes;
      delegate responsibility of rolling back any violating transactions to the one or more compute nodes in receipt of the adjusted prefix sum to locally evaluate an aggregation constraint, including identify any local transactions in violation of the aggregation constraint, and selectively apply a rollback protocol to the one or more violating transactions; and
      replace the last committed aggregate value with a refreshed current prefix sum and apply the refreshed current prefix sum for a subsequent interval aggregation.

8. The computer program product of claim 7, further comprising program code executable by the computer processor to maintain the last committed aggregate value by an incremental adjustment with a final interval aggregate value selectively adjusted for any rolled-back transactions provided by the one or more compute nodes.

9. The computer program product of claim 8, further comprising program code executable by the computer processor to process the current prefix sum in parallel with the final interval aggregate value, and adjust the current prefix sum responsive to asynchronous communications to mitigate application of the rollback protocol for an interval batch.

10. The computer program product of claim 7, further comprising program code executable by the computer processor to locally perform the rollback protocol for one or more failed transactions and excludes the one or more violating transactions.

11. The computer program product of claim 7, further comprising program code executable by the computer processor to initiate the interval aggregation constraint enforcement with a broadcast signal from a coordinating node to the one or more compute nodes.

12. The computer program product of claim 7, further comprising program code executable by the computer processor to modify an order of intra-node transaction processing for the one or more compute nodes for an interval batch to mitigate application of the rollback protocol.

13. The computer program product of claim 7, further comprising program code executable by the computer processor to modify an order of processing of one or more interval aggregate responses to mitigate application of the rollback protocol for an interval batch.

14. A computer implemented method to perform enforcement of an aggregation constraint, the method comprising:
   using a computer processor to access and process program code of computer memory operatively coupled to the computer processor:
      leveraging a last committed aggregate value as a current prefix sum for an interval aggregation;
      asynchronously receiving one or more remotely computed preliminary interval aggregate values from one or more operatively coupled compute nodes;
      assessing a preliminary interval aggregate responsive to the asynchronous receipt of the preliminary aggregate values, the assessment including:
         adjusting the current prefix sum with the one or more received preliminary interval aggregate values, including selectively applying a constraint requirement; and
         sending the adjusted prefix sum to the one or more compute nodes;
      delegating responsibility of rolling back any violating transactions to the one or more compute nodes in receipt of the adjusted prefix sum to locally evaluate the aggregation constraint, including identifying any local transactions in violation of the aggregation constraint, and selectively applying a rollback protocol to the one or more violating transactions; and
      replacing the last committed aggregate value with a refreshed current prefix sum and applying the refreshed current prefix sum for a subsequent interval aggregation.

15. The method of claim 14, further comprising maintaining the last committed aggregate value by an incremental adjustment with a final interval aggregate value selectively adjusted for any rolled-back transactions provided by the one or more compute nodes.

16. The method of claim 15, further comprising processing the current prefix sum in parallel with the final interval aggregate value, and adjusting the current prefix sum responsive to asynchronous communications to mitigate application of the rollback protocol for an interval batch.

17. The method of claim 14, further comprising performing the rollback protocol locally for one or more failed transactions and excluding the one or more violating transactions.

18. The method of claim 14, further comprising initiating the interval aggregation constraint enforcement with a broadcast signal from a coordinating node to the one or more compute nodes.

19. The method of claim 14, further comprising modifying an order of intra-node transaction processing for the one or more compute nodes for an interval batch to mitigate application of the rollback protocol.

20. The computer system of claim 1, wherein:
   the aggregate constraint engine is configured to access the program code of the computer memory and process the program memory with the computer processor to asynchronously receive one or more remotely computed preliminary interval aggregate values comprises the aggregate constraint engine configured to asynchronously receive the one or more remotely computed preliminary interval aggregation values at a coordinating node from two or more of the compute nodes that are remote with respect to the coordinating node, the two or more compute nodes configured to process in parallel with one another;

the aggregate constraint engine is configured to access the program code of the computer memory and process the program memory with the computer processor to send the adjusted prefix sum to the one or more compute nodes comprises the assessment manager configured to send the adjusted prefix sum to the two or more compute nodes;

the rollback manager is configured to access the program code of the computer memory and process the program memory with the computer processor to delegate rollback functionality to two or more compute nodes, including to run on the two or more compute nodes in receipt of the adjusted prefix sum to locally evaluate the aggregate constraint; and the rollback manager is further configured to access the program code of the computer memory and process the program memory with the computer processor to communicate a revised partial aggregate with the aggregation constraint engine.

\* \* \* \* \*